No. 837,695. PATENTED DEC. 4, 1906.
B. LJUNGSTRÖM.
CENTRIFUGAL MACHINE.
APPLICATION FILED MAY 19, 1905.
2 SHEETS—SHEET 1.
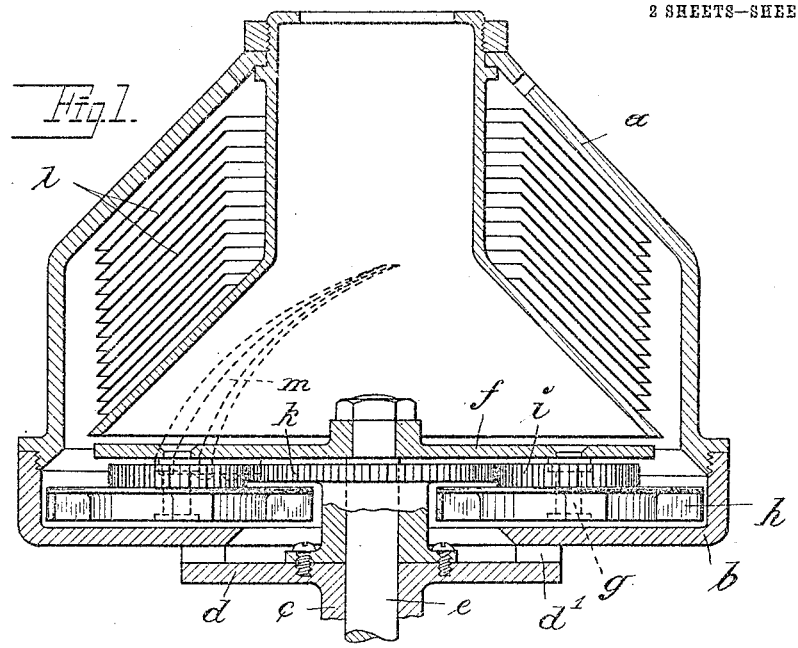
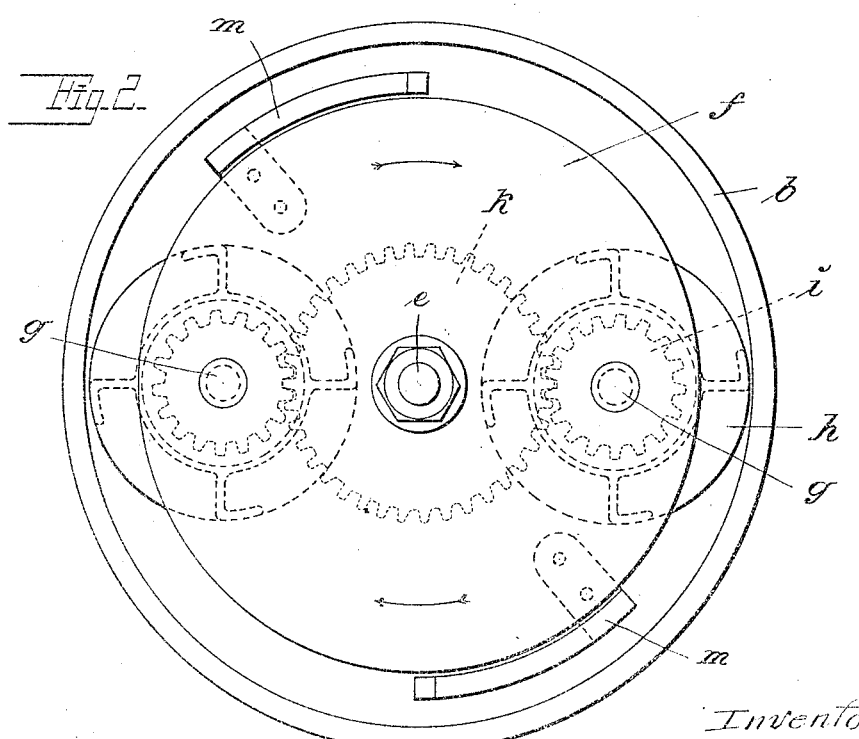

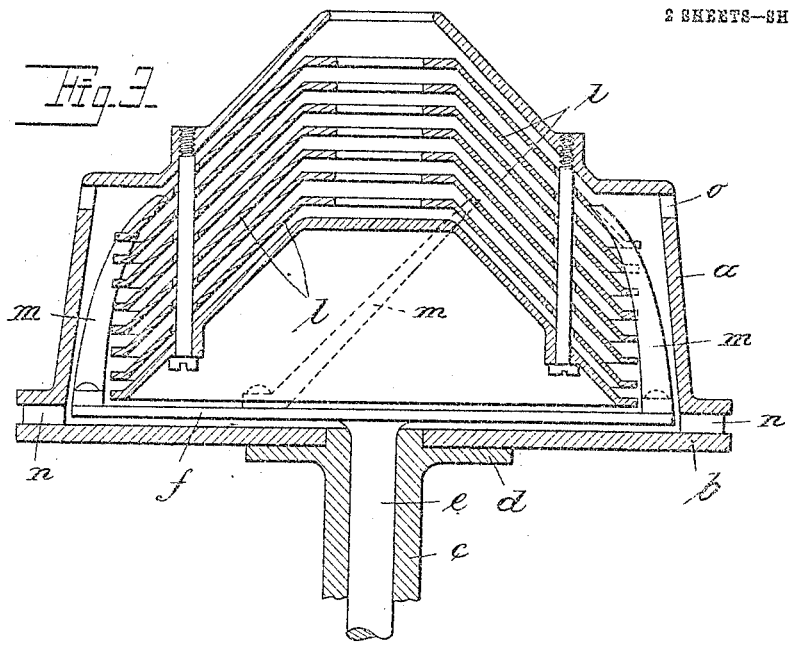
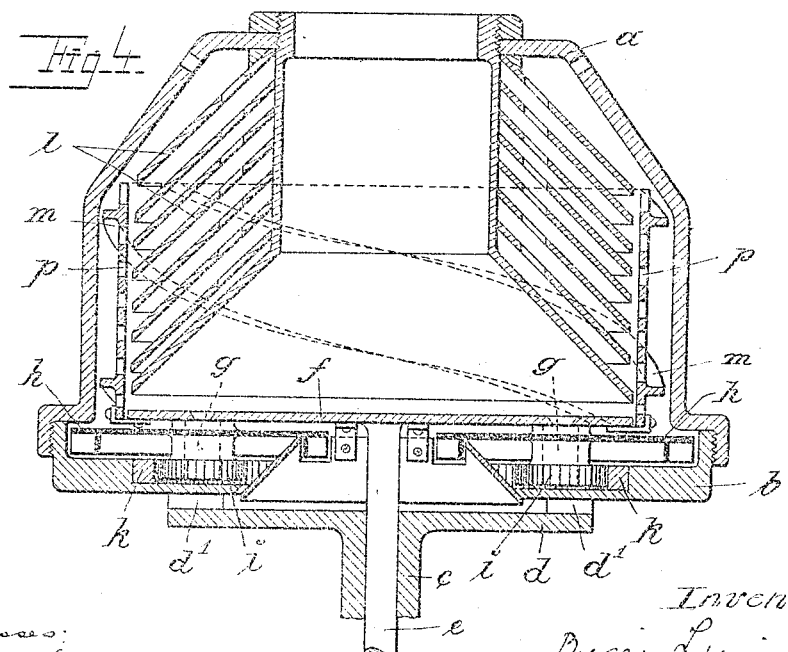

UNITED STATES PATENT OFFICE.

BIRGER LJUNGSTRÖM, OF STOCKHOLM, SWEDEN, ASSIGNOR TO AKTIEBOLAGET SEPARATOR, OF STOCKHOLM, SWEDEN, A COMPANY.

CENTRIFUGAL MACHINE.

No. 837,695.     Specification of Letters Patent.     Patented Dec. 4, 1906.

Application filed May 19, 1905. Serial No. 261,141.

*To all whom it may concern:*

Be it known that I, BIRGER LJUNGSTRÖM, a subject of the King of Sweden, residing at Stockholm, Sweden, have invented certain new and useful Improvements in Centrifugal Machines for Separating Solid Matters from Liquids; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to improvements in centrifugal separators such as used for separating liquids from solid matters; and it more particularly relates to arrangements for transporting the solid matters down the inner wall of the bowl to the devices in the bowl by which their continuous carrying away from the separator is performed.

As is described in the United States Patent No. 773,489, the solid matters that stratify along the inner wall of the bowl are brought outside the bowl by means of scraper-wheels carrying the solid matters transversely through the layer of liquid to a point within the same nearer the center of the bowl, whence the solid matters are continuously carried away in such a manner that they immediately before the scrapers of the scraper-wheels occupy their position nearest the center of the bowl, owing to the action of the centrifugal force and their own gravity, are loosened from the scrapers and then thrown downward through a central opening into a partition placed under the scraper-wheels or in the very bottom of the bowl. Other constructions are also known—as, for instance, such where the carrying away of the solid matters is effected by means of screws or the like. (Compare United States Patent No. 785,910.)

My present invention is applicable even to that kind of centrifugal machines and to all sorts of separators for separating solid matters from liquids where the solid matters stratify along the periphery of the bowl.

In the United States Patent No. 773,489 a centrifugal machine without liner and with a conical bowl that is relatively low is described. In such centrifugal bowls the solid matters on account of the action of the centrifugal force will slide on the wall of the bowl and be thrown out to the parts of the bowl that are at the greatest distance from the center line of the bowl. If, however, the bowl is provided with a liner that divides the bulk of the liquid in a radial direction into thin layers, the bowl must be made relatively high and with partly conical partly cylindrical wall. In this case the solid matters should amass along the cylindrical part of the bowl and there form a layer reaching up between the plates, and thereby the separating process would cease. In this case it is thus necessary to provide means for preventing this.

My present inventions relate to such means for carrying away the solid matters down or around the wall of the bowl to the device by which they are carried away out of the bowl.

The device is illustrated on the annexed drawings, wherein—

Figure 1 is a vertical section of a centrifugal bowl with my improvements applied thereto. Fig. 2 is a plan view of the under part of the bowl, the cover as well as the liner being removed. Figs. 3 and 4 each show in section other embodiments of my invention.

The bowl consists of an upper part or cover $a$ and an under part or bottom $b$, screwed together in the usual manner. In the bottom of the bowl the device for carrying away the solid matters out of the bowl is located. Fig. 1 shows this device in conformity with the United States Patent No. 773,489; but other devices for carrying away the solid matters out of the bowl may be used. The bottom $b$ is provided with a central circular opening the edge of which inclines outward. The driving-shaft $c$ of the bowl is enlarged at the top to a flange $d$, riveted to the bottom of the bowl or integral with it. Between the flange $d$ and the bottom $b$ of the bowl channels $d'$ $d'$, opening outward, are located. The driving-shaft $c$ is hollow, and within the same the massive shaft $e$ projects, on the top of which a disk $f$ is mounted. To this disk shafts $g$ $g$ are secured in a suitable manner. On these shafts the scraper-wheels $h$ $h$ and the cog-wheels *i i* turn. The cog-wheels *i i* mesh with a cog-ring on a central disk *k*, secured to the hollow shaft *c*, so as to rotate with the bowl. By this arrangement the shafts *g g* and the cog-wheels *i i* and scraper-wheels *h h* will receive a motion relative to the bowl as soon as the shaft *e* is rotated with a speed different to that of the shaft *c*. At the same time the scraper-wheels *h h* will rotate on their shafts *g g* as the cog-wheels *i i* mesh with the cog-ring on the disk *k*.

According to my present invention the carrying away of the solid matters separated from the liquid in the liner *l* and stratifying on the walls of the bowl are brought down to the bottom of the bowl, from where they are brought outside the separator by means of the scraper-wheels. This is effected by means of inclined scrapers *m*, secured to the disk *f* in a suitable manner. The scrapers *m* extend into the space between the liner *l* and the bowl. When the disk *f* rotates relative to the bowl, the scrapers *m* will continuously scrape the solid matters down the periphery of the bowl. In this way the solid matters cannot amass at the periphery of the bowl, but are continuously scraped off and pressed downward to the device by which they are carried out of the bowl.

In Fig. 3 my present invention is applied to another constructional form. The scraper wheels are here omitted, and between the cover and the bottom of the bowl the discharge-openings *n* are located. Other openings *o* are provided in the upper part of the bowl. The scrapers *m* are secured to the disk *f*, put in rotary motion by means of the shaft *e* at a speed different from that of the bowl. It does not matter in which direction the scrapers move, the effect being only that in the one case the solid matters leave the separator through the openings *n* and the liquid through the openings *o*. In the opposite case the solid matters leave through the openings *o* and the liquid through the openings *n*. If the scrapers incline only a little to the bottom plane of the bowl, they will get such a length that they would break under the action of the centrifugal force. Then it is necessary to fix the scrapers to a perforated drum secured to the disk *f*. This arrangement is illustrated in Fig. 4. The perforated drum *p* is secured to the disk *f* by means of stays or the like. On this drum *p* the scrapers *m* are secured in form of threads by means of screws or in any other suitable manner.

In the constructional form shown in Fig. 4 the devices for transporting the solid matters outside the separator may be of any kind whatever. On the drawings scraper-wheels are shown in conformity with Fig. 1. It is, however, evident that screws or other devices for carrying away the solid matters out of the bowl may be used. Instead of a perforated drum concentric rings may be used if the number of the scrapers is great, as then a sort of perforated drum is formed by the scrapers and the rings.

What I claim is—

1. In a centrifugal machine for separating solid matters from liquids, the combination with a rotary bowl having a liner, consisting of a series of plates intersecting the radial line of the bowl, of one or more inclined scrapers located in the space between the bowl and the liner and rotating with a speed different from that of the bowl.

2. In a centrifugal machine for separating solid matters from liquids, the combination with a rotary bowl having a liner, consisting of a series of plates intersecting the radial line of the bowl, of one or more inclined scrapers located in the space between the bowl and the liner and means to rotate said scrapers at a speed different from that of the bowl.

3. In a centrifugal machine for separating solid matters from liquids, the combination with a rotary bowl having a liner, consisting of a series of plates intersecting the radial line of the bowl, of one or more inclined scrapers located in the space between the bowl and the liner and means to rotate said scrapers at a speed different from that of the bowl and means for carrying away the solid matters, scraped down by the scrapers, out of the bowl.

4. In a centrifugal separator in combination a rotary bowl, a liner fixed thereto, a hollow shaft there being an outlet between the walls and the shaft, a second shaft projecting through said hollow shaft and constructed to be rotated with a speed different from that of the bowl, a horizontal flange secured to said second shaft, one or more scraper-wheels journaled in said flange and a perforated drum fixed to said flange and projecting in the space between the bowl and the liner, the exterior of said drum provided with inclined scrapers in form of threads for conveying the solid matters stratified on the walls to the scraper-wheels.

5. In a centrifugal machine, for separating solid matters from liquids, the combination with a rotary bowl having a liner, of a skeleton frame, between said liner and the wall of the bowl, and inclined scraper or scrapers secured to said frame and means to rotate said frame at a speed different from the speed of the bowl.

6. In a centrifugal machine for separating solid matters from liquids, the combination with a rotary bowl having a liner, of a perforated drum between said liner and the wall of the bowl, the exterior of said drum having one or more inclined scrapers, and means to rotate said drum at a speed different from the speed of the bowl.

7. In a centrifugal machine for separating solid matters from liquids, the combination, with a rotary bowl, having a liner, of a perforated drum between said liner and the wall of the bowl, the exterior of said drum having one or more spiral scrapers, and means to rotate said drum at a speed different from the speed of the bowl.

In testimony that I claim the foregoing as my invention I have signed my name in presence of two subscribing witnesses.

BIRGER LJUNGSTRÖM.

Witnesses:
K. E. WIBERG,
HARRY ALBIHN.